United States Patent
Maitenaz

[15] 3,687,528
[45] Aug. 29, 1972

[54] OPHTHALMIC LENSES WITH A PROGRESSIVELY VARYING FOCAL POWER

[72] Inventor: Bernard F. Maitenaz, Joinville-Le-Pont, France

[73] Assignee: Societe Des Lunetiers, Paris, France

[22] Filed: Sept. 8, 1970

[21] Appl. No.: 70,405

[30] Foreign Application Priority Data

Sept. 11, 1969 France......................6930906
Feb. 9, 1970 France......................7004474

[52] U.S. Cl............................351/169, 351/177
[51] Int. Cl. .............................................G02c 7/06
[58] Field of Search ...............351/169, 177; 350/189

[56] References Cited

UNITED STATES PATENTS 2,475,275  7/1949  Birchall ..................351/169 X
2,915,856  12/1959  Maitenaz................351/177 X
2,878,721  3/1959  Kanolt......................351/169

Primary Examiner—David H. Rubin
Attorney—Robert E. Burns and Emmanuel J. Lobato

[57] ABSTRACT

Ophthalmic lens having a progressively variable focal power and comprising a refracting surface consisting at least partly of a surface having an umbilical curve, so called progression umbilical curve, along which the radius of curvature evolves so as to provide the desired progressive variation of the focal power of said lens, wherein the section of said refracting surface taken along a plane orthogonal to the umbilical curve, for a specific plane, is substantially a circle, and for any other orthogonal plane a curve of which the radius of curvature increases or decreases in the direction away from said progression umbilical curve according as the radius of curvature of said progression umbilical curve at the point of the orthogonal plane involved is respectively smaller or greater than the radius of the substantially circular section.

9 Claims, 27 Drawing Figures

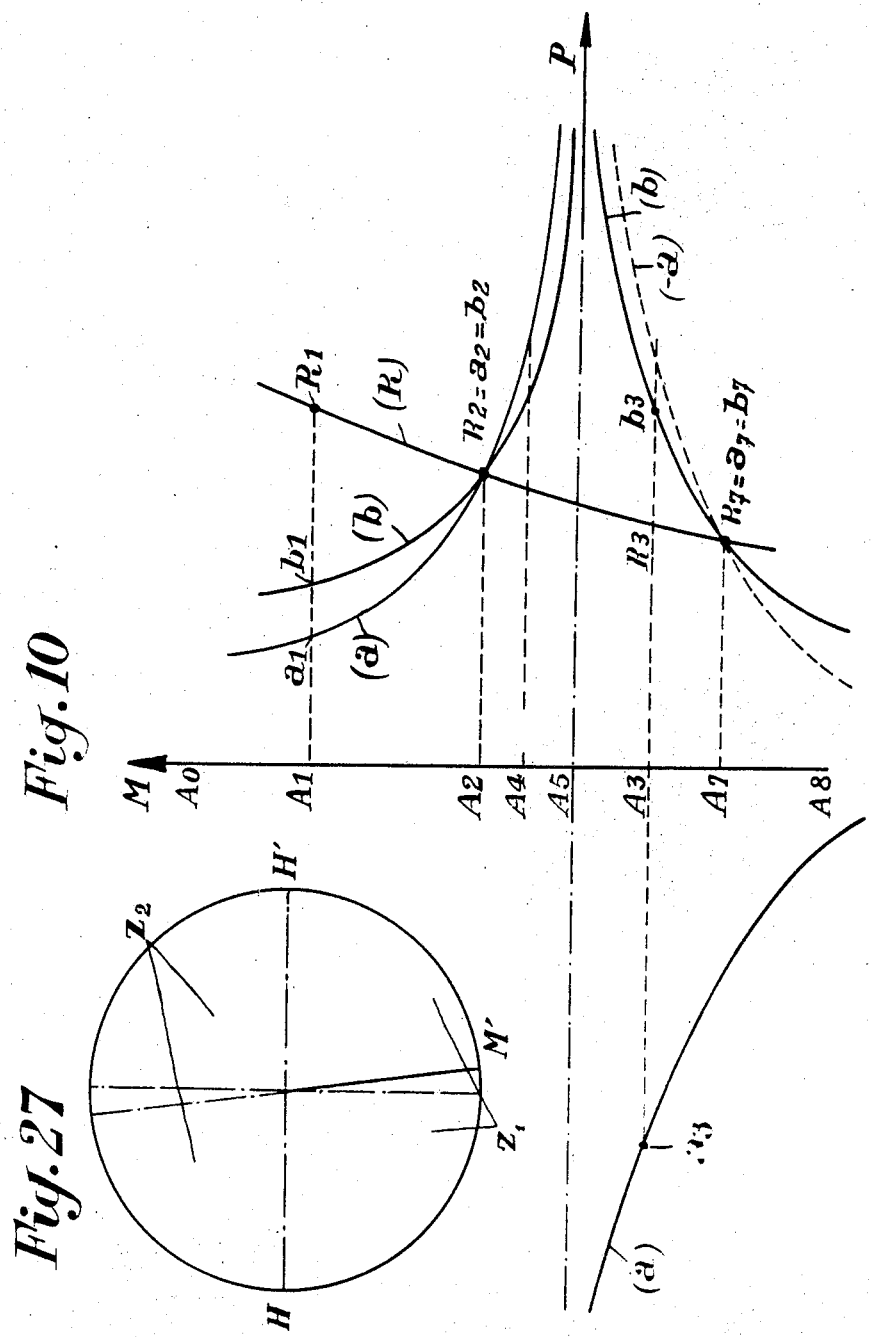

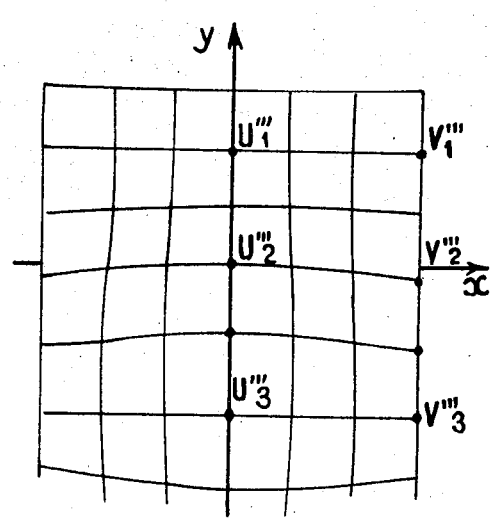
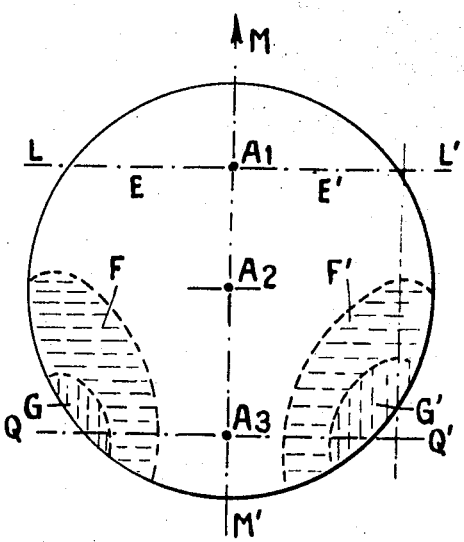
*Fig.15*    *Fig.16*
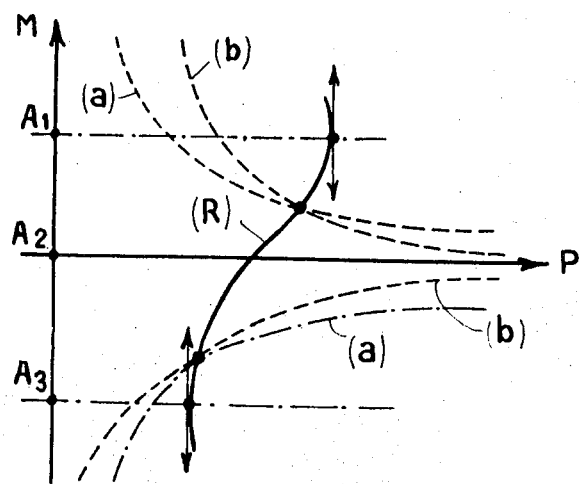
*Fig.17*

Fig. 19

| Vy \ Vx | 0° | 3° | 6° | 9° | 12° | 15° | 18° | 21° |
|---|---|---|---|---|---|---|---|---|
| +21° | 0,1388 | 0,1512 | 0,1870 | 0,2446 | | | | |
| +18° | 0,0970 | 0,1049 | 0,1293 | 0,1711 | 0,2316 | | | |
| +15° | 0,0707 | 0,0749 | 0,0897 | 0,1183 | 0,1643 | 0,2311 | | |
| +12° | 0,0521 | 0,0538 | 0,0623 | 0,0824 | 0,1188 | 0,1765 | 0,2605 | |
| +9° | 0,0357 | 0,0366 | 0,0429 | 0,0599 | 0,0930 | 0,1477 | 0,2292 | |
| +6° | 0,0197 | 0,0214 | 0,0299 | 0,0500 | 0,0864 | 0,1441 | 0,2281 | 0,3429 |
| +3° | 0,0061 | 0,0103 | 0,0251 | 0,0537 | 0,0997 | 0,1665 | 0,2571 | 0,3751 |
| 0 | 0,0-000 | 0,0079 | 0,0323 | 0,0741 | 0,1346 | 0,2149 | 0,3159 | 0,4388 |
| -3° | 0,0095 | 0,0219 | 0,0577 | 0,1153 | 0,1930 | 0,2897 | 0,4031 | 0,5319 |
| -6° | 0,0441 | 0,0609 | 0,1082 | 0,1815 | 0,2766 | 0,3894 | 0,5152 | 0,6497 |
| -9° | 0,1134 | 0,1336 | 0,1898 | 0,2754 | 0,3840 | 0,5095 | 0,6450 | |
| -12° | 0,2245 | 0,2461 | 0,3057 | 0,3959 | 0,5095 | 0,6398 | 0,7789 | |
| -15° | 0,3803 | 0,4005 | 0,4567 | 0,5423 | 0,6509 | 0,7764 | | |
| -18° | 0,5780 | 0,5948 | 0,6421 | 0,7154 | 0,8105 | | | |
| -21° | 0,8104 | 0,8228 | 0,8586 | 0,9162 | | | | |

Fig.22

| Vx / Vy | 0° | 3° | 6° | 9° | 12° | 15° | 18° | 21° |
|---|---|---|---|---|---|---|---|---|
| +21° | 68,35 | 69,06 | 69,51 | 69,70 | | | | |
| +18° | 71,29 | 71,10 | 70,91 | 70,16 | 69,79 | | | |
| +15° | 73,88 | 72,96 | 71,87 | 70,53 | 69,42 | 68,61 | | |
| +12° | 75,57 | 74,09 | 72,46 | 71,01 | 69,42 | 67,91 | 66,62 | |
| +9°  $A_1$ | 76,40 | 74,61 | 72,86 | 71,01 | 69,33 | 67,73 | 66,12 | |
| +6° | 75,57 | 74,09 | 72,46 | 71,01 | 69,42 | 67,91 | 66,62 | 64,99 |
| +3° | 73,88 | 72,96 | 71,87 | 70,53 | 69,42 | 68,61 | 67,39 | 66,46 |
| 0° | 71,29 | 71,10 | 70,91 | 70,16 | 69,79 | 69,70 | 69,15 | 68,97 |
| 1°12′  $A_2$ | 70,30 | 70,30 | 70,30 | 70,28 | 70,25 | 70,20 | 70,16 | 70,08 |
| -3° | 68,35 | 69,06 | 69,51 | 69,70 | 70,16 | 70,72 | 71,29 | 72,07 |
| -6° | 65,88 | 67,22 | 68,43 | 69,15 | 70,16 | 71,87 | 73,68 | 75,14 |
| -9° | 63,97 | 65,55 | 67,30 | 68,70 | 70,16 | 72,86 | 75,68 | |
| -12°  $A_3$ | 63,13 | 65,23 | 67,30 | 68,70 | 70,25 | 73,37 | 76,40 | |
| -15° | 63,97 | 65,55 | 67,30 | 68,70 | 70,16 | 72,86 | | |
| -18° | 65,88 | 67,22 | 68,43 | 69,15 | 70,16 | | | |
| -21° | 68,35 | 69,06 | 69,51 | 69,70 | | | | |

OPHTHALMIC LENSES WITH A PROGRESSIVELY VARYING FOCAL POWER

BACKGROUND OF THE INVENTION

1. Field of the Invention

The present invention relates in general to ophthalmic or spectacle lenses, and more particularly to lenses having a progressively varying focal power.

These lenses are used for compensating the partial sclerosis of the crystalline lens of the eye which prevents a normal close vision.

To compensate this visual defect, the lenses must have a focal power gradient permitting a continuous clear view of objects disposed at variable distances.

2. Description of the Prior Art

Several lens types have already been proposed for correcting this defect of the crystalline lens.

A known proposition comprises a convex surface, for example of isostigmatic character, completed by a cylindrical concave surface.

Other lens types comprise an aspherical surface having an umbilical line, the other surface being in the known manner either spherical or toric, according to the prescription resulting from the specific ametropia of the spectacle wearer. An umbilic is a point of a surface whereat the two main radii of curvature are equal; in other words, in the vicinity of this point the surface is substantially spherical. An umbilical line is a curve of a surface of which each point is an umbilic, or in other words in the vicinity of this umbilical line the surface is substantially the envelope of spheres having for their radius the radius of curvature of the umbilical line at each one of its points.

As a rule, these lenses are characterized by a zone intended for distant vision and having a certain focal power, and by a zone intended for close vision and having a different focal power, the difference between these two power values being generally referred to as the power "addition".

These lenses, whether they comprise one or two aspherical surfaces, meet their object in their central portion, the power varying progressively without allowing the aberrations to attain detrimental values.

However, in the lateral areas the astigmatism increases rapidly up to a value inconsistent with a proper vision of the observed objects.

SUMMARY OF THE INVENTION

It is the essential object of the present invention to provide an ophthalmic lens having a gradually variable focal power, of which the surface is such that the lateral aberrations are strongly reduced without impairing the quality of the central vision, thus improving to a substantial degree the visual comfort of the wearer.

This invention is concerned primarily with an ophthalmic lens having a progressively varying focal power, which comprises a refracting surface consisting at least partly of a surface having an umbilical curve, so-called progression umbilical curve, along which the radius of curvature evolves so as to provide the desired progressive variation of the focal power of the lens, this lens being characterized in that section of said refracting surface taken along a plane orthogonal to the progression umbilical curve is, for a specific plane, substantially a circle, and for any another orthogonal plane a curve of which the radius of curvature increases or decreases in the direction away from said progression umbilic according as the radius of curvature of said progression umbilical curve at the point containing said orthogonal plane is smaller or greater respectively than the radius of said substantially circular section.

BRIEF DESCRIPTION OF THE DRAWINGS

Other features characterizing this invention will appear as the following detailed description proceeds with reference to the attached drawings, in which:

FIG. 10 illustrates in the case of a surface according to this invention which is generated by evolutive conics, the variation in the parameters $a$ and $b$ of said conics;

FIG. 15 illustrates the distortion of a surface having one secondary umbilical curve and one line having a constant vertical prismatic effect;

FIG. 16 illustrates the arrangement of the lens elements of FIG. 15;

FIG. 17 is the equivalent of FIG. 10 in the practical example given herein;

FIG. 19 is a table giving the distances from said sphere to points disposed at spaced intervals on the surface of said exemplary lens;

FIG. 22 illustrates the half-table of the radii of curvature of the points concerned on the surface of the exemplary lens;

DESCRIPTION OF THE PREFERRED EMBODIMENTS

The essential characteristic of the various progressive surfaces resides in a generally plane umbilical line MM' (FIG. 1) along which the radius of curvature of the surface evolves according to a law capable of producing the desired continuous variation of the focal power of the lens.

This property will be better understood by studying the shape of the section of the surface taken along a main plane orthogonal to the osculating plane at the meridian MM'.

Thus, at point A3 (FIG. 1), for instance, the plane $L_3$ orthogonal to the assumedly plane meridian MM' intersects the surface with a section $C_3 C^1_3$.

At $A_3$ the radius of section $C_3 C^1_3$ is equal to $R_3$, the radius of curvature of the meridian MM' at $A_3$ being also equal to $R_3$.

The surface element adjacent to said point $A_3$ will thus behave like a spherical surface element since its main radii are equal.

The same applies to points $A_2$ and $A_1$, the radii of curvature varying gradually to $R_2$ at $A_2$ and $R_1$ at $A_1$.

This general property is independent of the shape of meridian MM'.

The shape of this meridian MM' is subordinate only to the desired additional power between two specific points intended the one for distant vision and the other for close vision.

Figure 2:
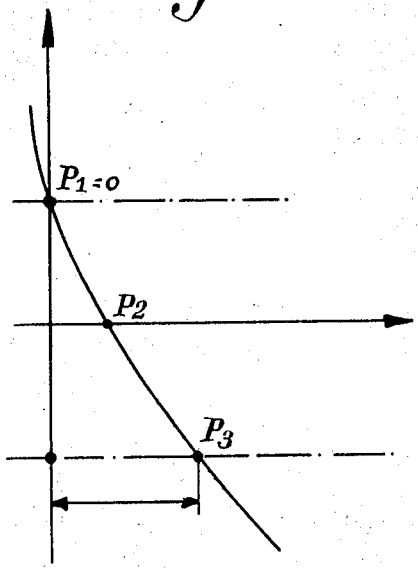
FIG. 2 is a diagram showing the curve of variation in the focal power along the progression meridian of a progressive focal power lens of the prior art.

FIG. 2 illustrates a typical example of a focal power variation or gradient easily obtained by taking for MM' a curve such as an involute of a circle.

The radii of curvature of the other face of the lens are selected to produce zero power at point $A_1$, the power increasing gradually up to a value $P_3$ corresponding to the desired addition.

Of course, the rate of this additional power or power increment between distant vision and close vision may be modified by taking different curves as the meridian.

From a meridian determined according to the selected law of progression, the progressive surface may be considered as being the envelope of the main sections at each point of said meridian.

The first surfaces made according to this principle comprised circular sections.

The resulting surface may be easily imagined when a circle of variable radius is caused to slip along the meridian MM', the center of the circle merging at any moment into the centers of curvature of the meridian at the tangential point.

Thus, the variable circle will have a radius $R_1$ at $A_1$ and a radius $R_3$ at $A_3$.

Figure 3:
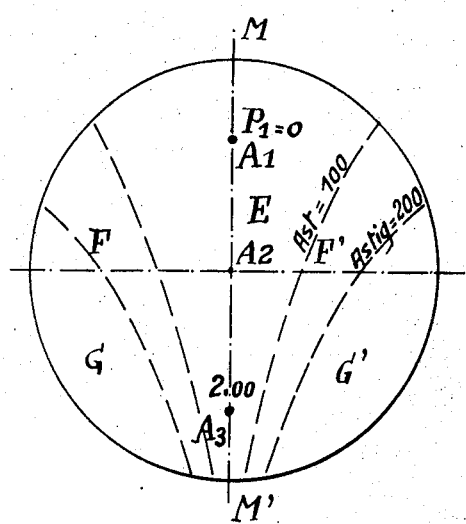
FIG. 3 is another diagram showing the aberrations distributed over the surface of prior art lenses.

It is an easy matter to generate such surfaces, but they lead to lenses of which the aberrations are distributed as shown in FIG. 3.

The zone E comprising one-diopter or lower aberrations is compensated on either side of the meridian MM'.

This zone is relatively wide at point $A_1$ but it narrows down at $A_2$ and become eventually very narrow at $A_3$.

The aberration zones F and $F^1$ (having aberrations ranging between 1 and 2 diopters) have the same general disposition in relation to the meridian.

As to zones G and $G^1$ of which the aberrations attain levels in excess of 2 diopters, they are localized in the lower and central lateral portions of the lens.

Figure 4:
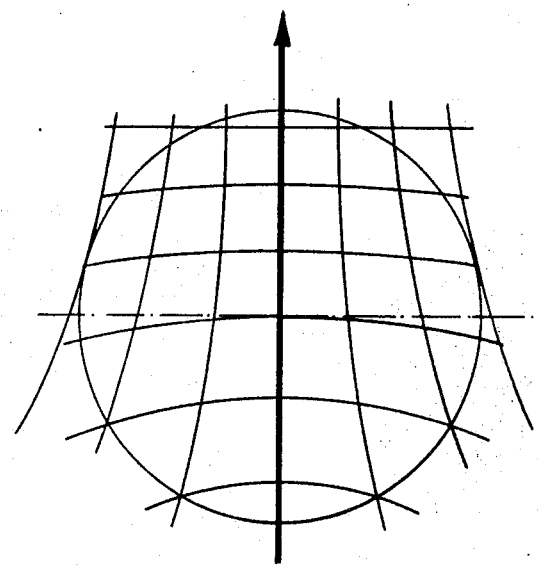
FIG. 4 shows the corresponding distortion.

The distortion given by the lens is another consequence of the aberrations described in FIG. 3, a grid comprising spaced horizontal and vertical lines (see FIG. 12) is seen through the entire lens surface, as shown in FIG. 4.

The horizontal lines of the grid are curved downwards and the vertical lines are curved sidewise, giving a distortion of the biconical-asymmetric type, an uncomfortable distortion since it gives an oblique vision of the verticals and produces a pitching effect when the wearer moves the head.

Other progressive surfaces have been developed from the same meridian by using different orthogonal sections, for example conic sections.

If the orthogonal sections utilized are parabolas, a distribution of the aberration illustrated in FIG. 3 will be slightly improved in the lower portion of the lens, but the resulting field is not sufficient, and on the other hand the distortion is very slightly reduced but still produces an objectionable effect of the same order.

According to the present invention, these defects are reduced to a great extent by adopting a surface wherein the sections orthogonal to MM' evolve gradually between two separate groups, one inscribed in the osculating circle at the selected point of MM', the other "exinscribed" with respect to said osculating circle.

Figure 5:
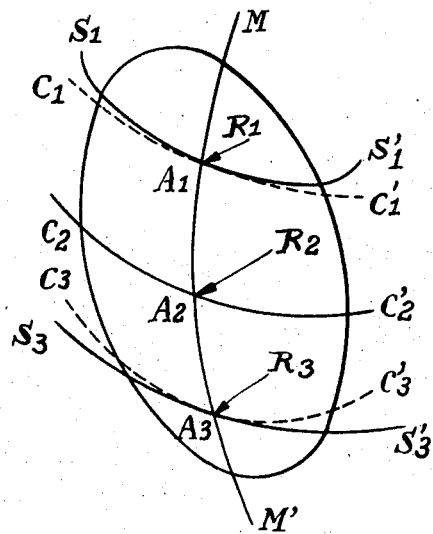
FIG. 5 shows diagrammatically the evolution of the orthogonal sections of the meridian of the lens according to this invention.

The surface thus defined has in general the appearance shown in FIG. 5. The meridian MM' may be similar to the meridian MM' of FIG. 1.

The sections $S_3 S^1_3$ through the plane $L_3$ orthogonal to the plane of meridian curve MM' at point $A_3$ is a curve external to the circle $C_3 C^1_3$ defined hereinabove with reference to FIG. 1.

Figure 1:
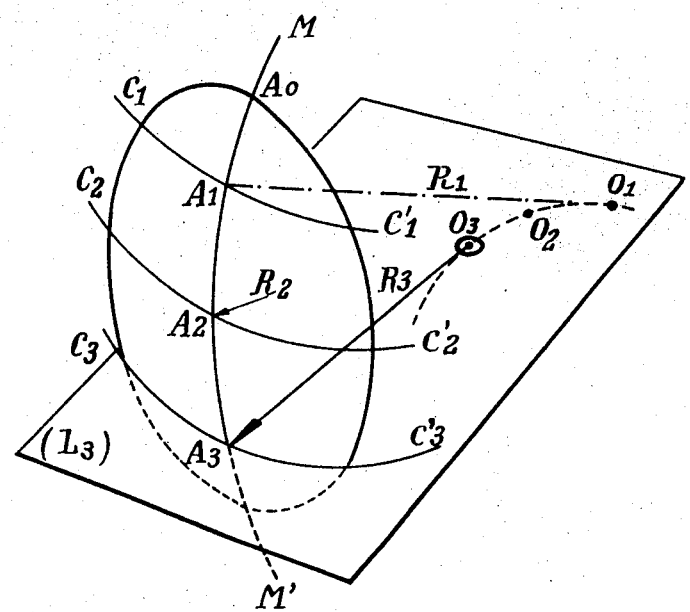
FIG. 1 is an explanatory diagram concerning a lens having an umbilical meridian curve of progression.

In contrast thereto, the section $S_1 S^1_1$ at $A_1$ through the plane $L_1$ is a curve internal to the circle $C_1 C^1_1$ shown in FIG. 1. Since these main sections evolve gradually from the "inscribed" type above $C_1 C^1_2$ to the "exinscribed" type below $C_2 C^1_2$, it will be readily understood that a certain section located between these two types is comparable to a circle for all practical purposes, for example section $C_2 C^1_2$ at $A_2$.

For any point A (FIG. 6) of the meridian the difference $e$ between the section S of the surface and the corresponding circle C increases with the distance between point A and point $A_2$.

This difference is $<0$ if point A lies above $A_2$ and $>0$ if it lies beneath (by convention, the difference is referred to as a negative one when it is directed towards the center of curvature).

Figure 9:
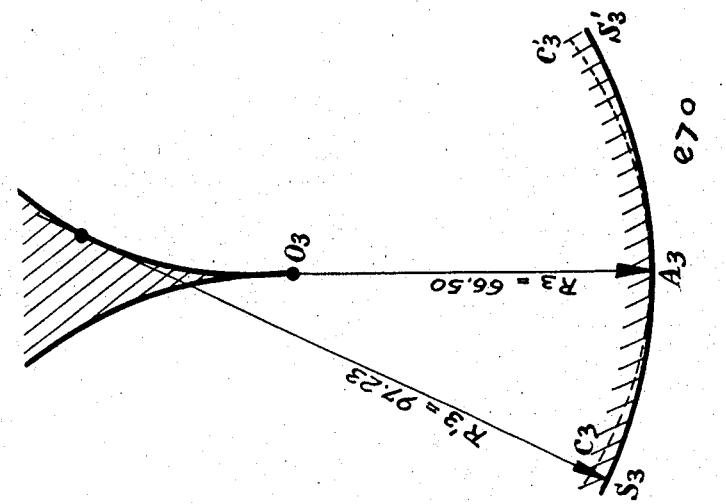
Figure 8:
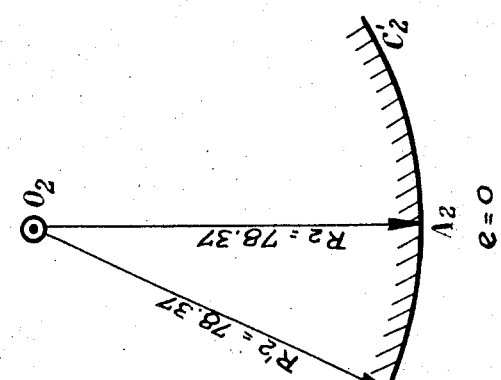
Figure 7:
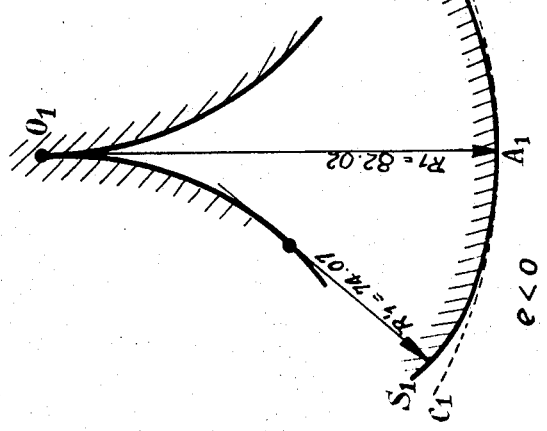

The three sections at points $A_1$, $A_2$ and $A_3$ are illustrated in FIGS. 7, 8 and 9, respectively.

At $A_2$ the section is circular, the radius $= R_2$ and the circle is $C_2$.

At $A_1$ the osculating radius is $R_1$ but since the section is inscribed in the circle centered at $C_1$ the lateral radius decreases $R^1_1 < R_1$.

Therefore, the evolute of section $S_1 S^1_1$ has the shape of an arrow-head pointing upwards.

In contrast thereto, the radius of curvature of section $S_3, S^1_3$ which is equal to $R_3$ at $A_3$ increases in the direction away from $A_3$ ($R^1_3 > R_3$).

The evolute of section $S_3 S^1_3$ has the shape of an arrowhead but pointing downwards.

Under these conditions, in comparison with the surface shown in FIG. 1 the cross-sections of which consist of circles, the surface of the invention appears laterally as having a "worn" upper portion, while in fact it has an extra thickness in its lower portion.

The difference $e$ between the surface section and the corresponding circle is negative in FIG. 7 and positive in FIG. 9.

As already explained in the foregoing a linear section S at a linear point A is characterized by lateral differences in relation to the circle which are positive or negative according as the point lies above or below the point of circular section, the passage from one group of sections to the other taking place gradually, without any discontinuity.

The running sections S may be of any type, for instance algebraic or not, but they must compulsorily have a radius of curvature along the meridian that complies with the law defined along the umbilical meridian curve $MM^1$.

By way of example, the case of a lens having a two-diopter power addition and comprising sections S in the form of evolutive conics will now be described.

Figure 6:
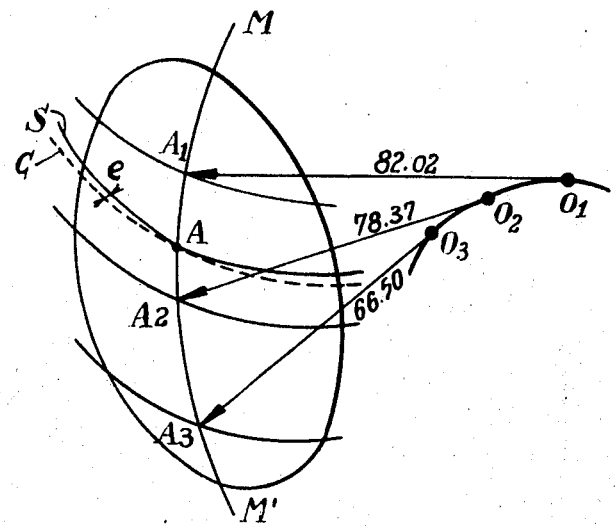
FIGS. 6, 7, 8 and 9 are explanatory diagrams in connection with FIG. 5.

The lens power along the meridian (FIG. 6) has the following values respectively:
- $P_1 = 0$ at $A_1$
- $P_2 = 0.50$ at $A_2$
- $P_3 = 2$ at $A_3$ The corresponding radii of curvature of the meridian and the orthogonal sections are as follows:
- $R_1 = 82.02$ mm
- $R_2 = 78.37$ mm
- $R_3 = 66.50$ mm, as shown in FIG. 6.

The running sections S located above $A_2$ are ellipses, and the greater the distance between the point A contemplated and the point $A_2$, the flatter the ellipse.

Thus, at point $A_1$ the section is an ellipse characterized by two half axes $a_1 = 15.1$ mm and $b_1 = 35.2$ mm.

The radius of curvature at the center: $b^2_1/a_1 = 82.02$ mm $= R_1$.

In contrast thereto, the sections located below $A_2$ are conical and the distances from these sections to the circle increase as the distance between said point and $A_2$ increases.

At $A_3$ the section is hyperbola characterized by $a_3 = 125.8$ mm and $b_3 = 91.50$ mm. The radius of curvature at $A_3$ is $b^2_3/a_3 = 66.50$ mm $= R_3$.

Between $A_2$ and $A_3$, the sections evolve between the circle and the hyperbola through elongated ellipses and a parabola.

FIG. 10 shows the manner in which the sections shown in FIG. 6 evolve. The vertical axis comprises the points $A_1$, $A_2$, $A_3$. The horizontal axis permits of inscribing the evolution of the various parameters. The curve R illustrates the evolution of the osculating radius, curves $a$ and $b$ show the evolution of the horizontal and vertical half axes of the conic sections, respectively.

At $A_1$, $a_1 < b_1 < R_1$ : the section is a flattened ellipse.
At $A_2$, $a_2 = b_{20}$ $R_2$ : the section is circular.
At $A_4$, $a_4 > b_4 > R_4$ : the section is an elongated ellipse.
At $A_5$, $a$ and $b = \infty$ : the section is a parabola.
At $A_3$, $a_3$ is negative $|a_3| > b_3 > R_3$ : the section is an acute parabola.
At $A_7$ $|a_7| = b_7 = R_7$ : the section is an equilateral hyperbola.
Beyond $A_7$, obtuse hyperbolas are obtained.

Under these conditions, the following domains may be ascertained:
$A_0A_2$ : domain of flattened ellipse.
$A_2$ : circular section.
$A_2A_5$ : domain of elongated ellipses.
$A_5$ : parabolic section.
$A_5A_7$ : domain of acute hyperbolas
$A_7$ : equilateral hyperbola
$A_7A_8$ : domain of obtuse hyperbolas.

In this example, therefore, the useful surface portion comprises evolutive conic sections changing gradually from the flattened ellipse in the upper portion to the obtuse hyperbolas in the lower portion, including along the range a circle, elongated ellipses, a parabola and acute hyperbolas. Of course, this example is given by way of illustration only but it will readily occur to those conversant with the art that the present invention includes all surfaces falling within the general definition, whether algebraic or other sections are utilized.

The above example is selected by taking as a progressive surface the convex surface of the lens ($R_3 < R_1$).

It would not constitute a departure from this invention to use a concave progressive surface. In this case, the additional power is derived from a meridian having an increasing radius of curvature ($R_3 > R_1$).

Similarly, in the manufacture of organic lenses, the law of progression of the progressive surface of the mould must be reversed, but in either case the sections evolve gradually from sections inscribed in the osculating circles to exinscribed sections containing said osculating circles.

Figure 11:
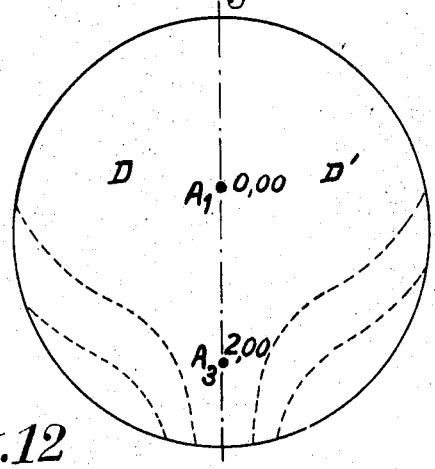
FIG. 11 illustrates the isoastigmatism curves of this lens.
Figure 13:
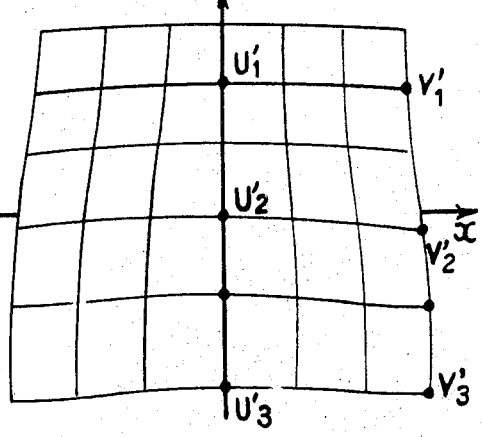
FIG. 13 the distortion of the lens of this invention in comparison with said grid.

FIGS. 11 and 13 illustrate the results obtained with lenses having one surface formed according to the above description.

The aberrations are moved back towards the lateral lower zones (FIG. 11), thus freeing the useful zones D and $D^1$ of considerably greater area and significance.

The fields available in distant vision, intermediate vision and close vision are widened considerably.

Figure 12:
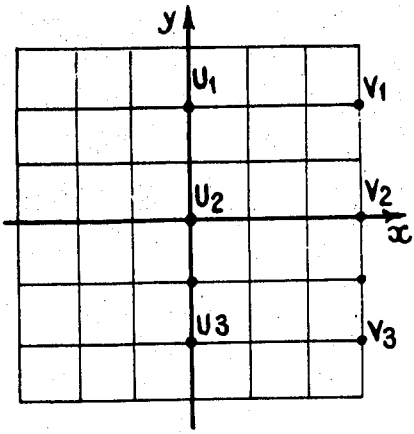
FIG. 12 shows an object grid.

Similarly, the resultant distortion is strongly reduced (FIG. 13), thus improving the wearer's comfort to a substantial degree. With the above-described lens an object as shown in FIG. 12 as seen with a distortion as shown in FIG. 13. The apparent position of the image V'1 of an object-point VI depends on the orientation of the normal to the progressive surface at the point where the light beam penetrating into the wearer's eye intersects the progressive surface. The ratio of the image segment U'1 V'1 to the object segment U1 V1 corresponds to the horizontal magnification Gx given by the lens at the point concerned ($A_1$ in this case). Similarly, the vertical magnification is given by the ratio of the corresponding segments, for example on the meridian, in the upper portion of the lens $G(y) = U'1 \ U'2/U1 \ U2$. Of course, the distribution of the magnifications depends on the focal power distribution and therefore on the evolution of the radii of curvature throughout the surface.

Figure 14:
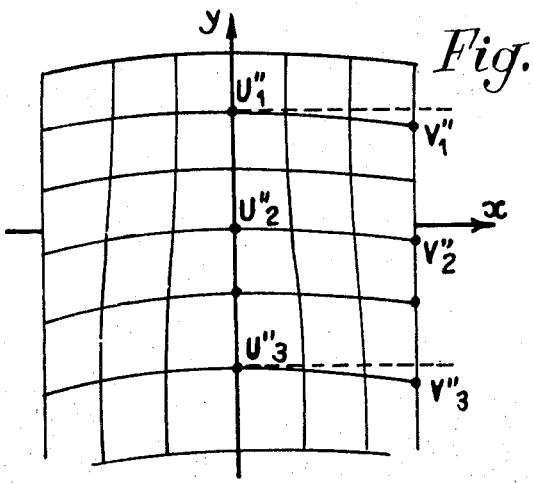
FIG. 14 illustrates the correction of the lateral distortion of the vertical lines, in the same grid.

The advantageous feature characterizing these surfaces is that they produce a very reduced distortion, for the magnifications Gx at $A_1$ and $A_3$ are greater and smaller, respectively, than those given by, say, a circular-sectioned progressive surface, with the result that the ratio $U''1V''1/U''3V''3$ approaches 1. It is also possible to cause G (x) at $A_1$ to approximate G (x) at $A_3$, that is, with $U''1 V''1 \neq U''3 V''3$, thus eliminating for all practical purposes the lateral distortion of the vertical lines (FIGS. 14).

The surfaces thus obtained will thus partly correct the distortion of verticals but leave unaltered the distortion of the horizontals and the relevant astigmatism.

To avoid these inconveniences, these surfaces are caused to display on the one hand a second or third umbilical curve in the vicinity of the distant-vision areas and close vision areas, respectively, and on the other hand one or a plurality of lines substantially normal or parallel to the umbilical curve of progression MM', i.e. extending substantially horizontally or vertically, respectively, when the lens is in position of use with its meridian MM' extending substantially vertically, along which lines the prismatic effect has a constant vertical or horizontal component; in other words, the plane tangent to the surface at one of the points of these vertical or horizontal lines forms a constant angle with the osculating plane or the plane perpendicular to the osculating plane at the point of the umbilical curve of progression where the prismatic effect of the lens is zero, which is the optical center of said lens by definition.

Although these secondary umbilical curves can be skew and oblique in most instances, reference will be made herein after to surfaces having umbilical curves plane and orthogonal to MM', in order to simplify the disclosure.

Thus, for example, a surface will be formed (FIG. 16) which admits firstly an umbilical curve $LL^1$ in the distant-vision area, which intersects the meridian of progression at $A_1$ and of which the radius of curvature will change gradually from $A_1$ to the lens edge whereby the lateral magnification will give (FIG. 15) a segment $U'''_1 V'''_1$ of a length approaching as much as possible the length of $U'''_3 V'''_3$. Since these distant-vision areas E and $E^1$ are close to $LL^1$, they will be free of important aberrations and the aberration zones $FF^1$ and $GG^1$ will be transferred laterally and downwards. Furthermore, the same surface will have a line $QQ^1$ orthogonal to MM' (FIG. 16) at $A_3$, along which the vertical component of the prismatic effect is constant. As a consequence, $U'''3$ and $V'''3$ is rectilinear. Thus, the rectangle U1 V1 U3 V3 (FIG. 12) will be seen substantially as another rectangle $U'''1 V'''1 V'''3 U'''3$ (FIG. 15); the total reduction in the distortion improves considerably the feeling of comfort of the wearer, the pitching effect disappearing completely.

Now the process for calculating and obtaining a lens having a progressively variable focal power, and the result thereof, will be described by way of example, this lens having an addition P3 − P1 = 1.50 D and comprising, in addition to the umbilical meridian of progression MM' (FIG. 20) two secondary umbilical lines rectangular thereto at $A_1$ and $A_3$, these umbilical lines being at the same time the lines along which the vertical component of the prismatic effect is constant, and finally two vertical lines (not shown in FIG. 20) parallel to the meridian MM', which are disposed symmetrically on either side of said meridian with $V_x = \pm 22°5$, and giving a constant horizontal component of the prismatic effect.

As a first approximation this surface may be considered as being generated by a group of evolutive conic sections, as already explained in the foregoing, the variations in the parameters being given by the curves of FIG. 17, with, in addition, the complementary requirement that the curve giving the variation of R as a function of the position of point $a$ (R being the radius of curvature of the meridian) admits a vertical tangent for A1 and A3, the secondary umbilical lines orthogonally intersecting said meridian at said point. To calculate this surface the following method is adhered to:

Firstly, the "framework" of the surface is determined by conventional optical calculations, said framework comprising in the selected example:

The profile of the meridian MM' capable of providing the desired law of progression (FIG. 17). Since this meridian is of umbilical character, the desired surface is readily known in its vicinity.

The profile of the two secondary umbilical curves, given the preliminary requirement that for the two points equally spaced from the meridian MM', which points are defined by their spherical coordinates ($V_x = +22°5, V_y = +9°$) and ($V_x = +22°5, V_y = -12°$) respectively, the lateral magnifications have an identical horizontal component; in other words, at these two points the normals to the surface must form equal angles with the plane of the main umbilical meridian MM'. Having positioned these two secondary umbilical lines at the points where the radius of the meridian attains a maximum or minimum value, the vertical component of the prismatic effect is constant along these lines, thus meeting automatically the requirement set beforehand.

Then a computer is used for calculating the families or groups of evolutive conic sections meeting the above-defined requirements, i.e., which include on the one hand the predetermined elements of the "-framework" and admitting on the other hand, for two points of the secondary umbilical curves equally spaced from the meridian, normals forming identical angles with the plane of the main umbilical meridian.

Figure 18:
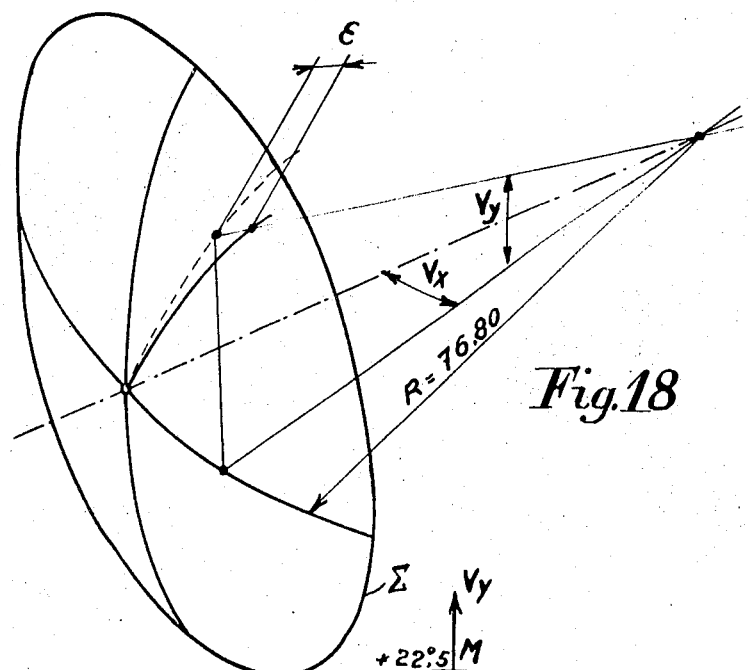
FIG. 18 shows the reference sphere and the system of coordinates used for determining the surface of the above example.

This calculation of the surface is performed by taking as reference a basic sphere (FIG. 18) having in this example a radius of 76.80 mm, the surface being determined by a table of discrepancies in relation to said sphere, which discrepancies are counted on the radius passing through a great number of regularly spaced points denoted by their spherical coordinates $V_x$ and $V_y$.

For each group of curves giving the result contemplated the computer will give directly in the same reference system the diagram or "map" of the aberrations and the "map of the distortions".

The choice, and possibly interpolations, are made for correcting the residual defects; under these conditions, the evolutive curves may cease to be simple curves, such as conics, for example.

Then the computer delivers for the selected surface a table displaying the discrepancies from the sphere in millimeters and possibly with all the necessary interpolations (FIG. 19).

From this table of discrepancies a model of the surface is cut from a block of special steel by using a diamond grinder reproducing by its wearing action the discrepancies appearing in the table of FIG. 19 at a great number of points. Then, this surface is reproduced in turn on a block of refracting material or on a block of material adapted to be used for making a mold for the commercial production of lenses by casting a suitable polymerizable material. This surface is subsequently lapped and polished by using a flexible polishing member.

Figure 20:
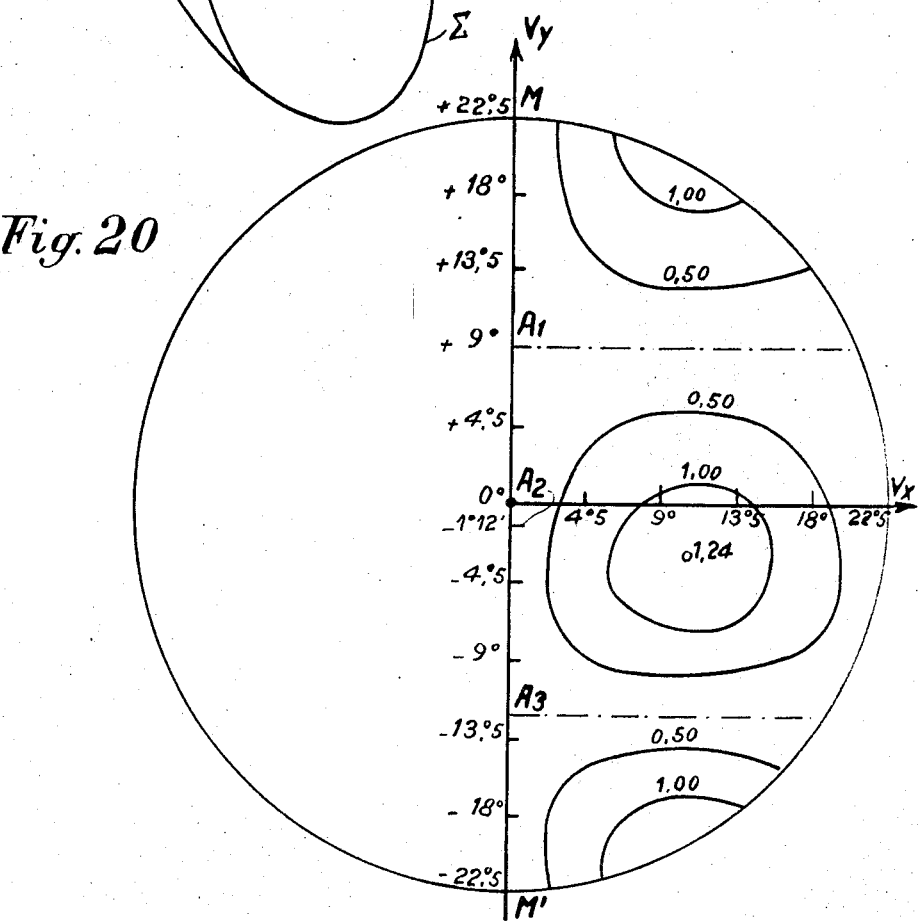
FIG. 20 illustrates the relative arrangement of the remarkable optical elements of this example.
Figure 21:
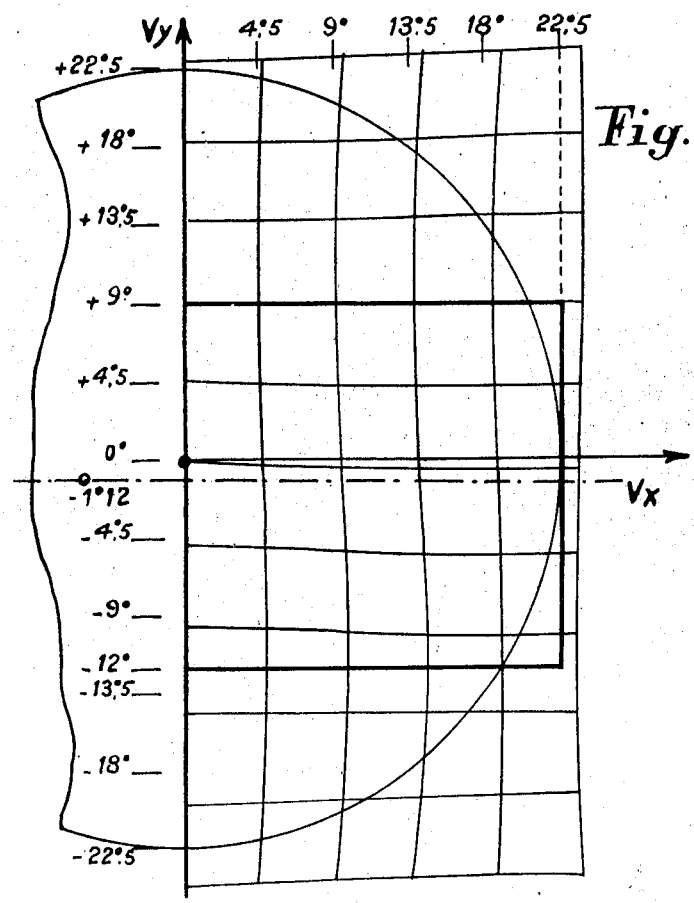
FIG. 21 shows the distortion of the grid of FIG. 12 seen through the exemplary lens.

The results obtained with this surface are shown in FIGS. 20 and 21. As this surface is symmetric in relation to the meridian MM', only one half thereof is shown and described in detail.

FIG. 20 is the diagram of aberrations. It will be seen that in both distant-vision and close-vision conditions a very wide lateral field is available; this lateral field is obtained by accepting aberrations in the upper region of the distant-vision area and in the lower region of the close-vision area, since they are not objectionable as a source of discomfort because as a rule most of them disappear during the final trimming of the lens before fitting same in a spectacle mounting; on the other hand, aberrations are formed on the horizontal diameter limiting the lateral field of vision in the intermediate-distance area of vision of the lens.

FIG. 21 shows how the grid of FIG. 12 is seen through this lens. It will be seen that this distortion is extremely reduced.

The following table gives the vertical component of the prismatic effect, expressed in radians, along two secondary umbilical lines denoted $V_Y = +9°$ and $V_y = -12°$.

|  | $V_x$ | 0° | 4°5 | 9° | 13°5 | 18° | 22°5 |
|---|---|---|---|---|---|---|---|
| Vertical deflexion | $V_Y = 9°$ | 0.0021 | 0.0021 | 0.0021 | 0.0021 | 0.0021 | 0.0021 |
|  | $V_1 = -12°$ | 0.0177 | 0.0177 | 0.0177 | 0.0177 | 0.0177 | 0.0177 |

It will be seen that this component is in fact constant along the two secondary umbilical curves, this accounting for the fact that the horizontal straight lines of the grid are not distorted in the vicinity of these curves.

The next table herebelow shows the horizontal component of the prismatic deflection, also expressed in radians along the meridian MM' and along the curve corresponding to $V_x = 22°5$.

| $V_y$ | Horizontal deflexion meridian | $V_x = 22°5$ |
|---|---|---|
| + 22°5 | 0 | 0.0186 |
| + 18° | 0 | 0.0193 |
| + 13°5 | 0 | 0.0198 |
| + 9° | 0 | 0.0200 |
| + 4°5 | 0 | 0.0198 |
| 0 | 0 | 0.0193 |
| − 4°5 | 0 | 0.0186 |
| − 9° | 0 | 0.0180 |
| − 13°5 | 0 | 0.0179 |
| − 18° | 0 | 0.0184 |
| − 22°5 | 0 | 0.0191 |

Of course, this deflection is zero on the meridian MM' which lies in the plane of symmetry of the surface, but it remains substantially constant and very moderate along the curve corresponding to $V_x = 22°5$, this accounting for the negligible grid distortion as clearly apparent in FIG. 21.

Referring now to the table of FIG. 22 giving for each point of the table of FIG. 19 the radii of curvature (in mm) of a surface thus obtained, it will be seen that this surface corresponds exactly to the definition of the present invention given hereinabove.

The substantially circular section is at $V_y = -1°12^1$ and its radius approximates 70.30 mm.

Above said circular section the radius of the meridian MM' increases and it will be seen that if $V_y = +19°$ the radius of the umbilical curve in distant vision decreases in the direction away from the meridian MM', and below said circular section the radius of the meridian MM' decreases; furthermore, it will be seen that if $V_y = -12°$, corresponding to the close-vision umbilical curve the radius of curvature increases in the direction away from the meridian MM'.

Of course, this example was selected because it combines into a same and single case a typical example each one of the specific features which may characterize a surface according to this invention. Therefore, it should not be construed as limiting the scope of the invention; more particularly, it would not constitute a departure from the field of this invention to provide surfaces of the above-defined type comprising variable number of specific lines such as secondary umbilical curves or curves along which at least one of the components of the prismatic effect remains constant.

Figure 23:
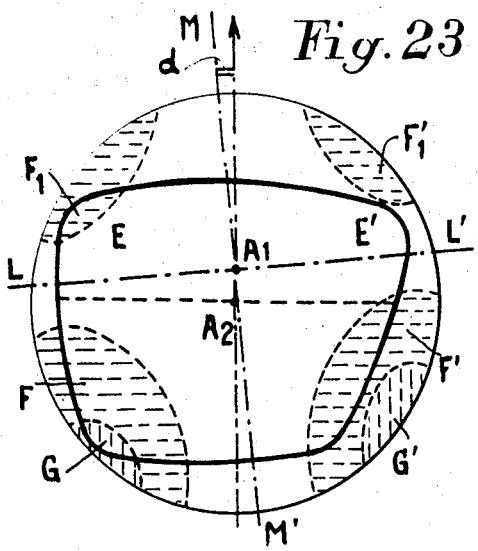
FIG. 23 shows the contour of the trimmed lens before fitting same into the wearer's spectacle mounting by inclining the meridian.

These surfaces will be uses as customary, i.e. with the meridian MM' inclined to the vertical by an angle $d$ of about 10° (FIG. 23). If surfaces symmetrical in relation to MM' are used, difficulties may arise in the region of the upper temporal corner due to the presence of aberrations (F1).

In order to simplify the understanding of this invention the above description was made by assuming that the two portions of the lens, on either side of the meridian, are identical.

An arrangement according to the present invention which would be particularly advantageous as far as the reduction of these distant-vision aberration F1 is concerned consists in providing a refracting surface from a half-surface according to this invention, bounded by the plane of its secondary umbilic $LL^1$ in distant vision, and completing the lens surface within the lens contour by effecting a symmetry on the discrepancy table in relation to the row of said table corresponding to said plane. This arrangement leads to the replacement of detrimental aberrations in the upper region of the lens (i.e. for distant vision) by a slight progression in the focal power, this progression being much better tolerated by the wearer who on the other hand is generally unaware of it.

Similarly, it would not constitute a departure from the scope of the present invention to obtain the refracting surface through successive symmetries about a suitably selected point of the surface according to this invention.

Figure 24:
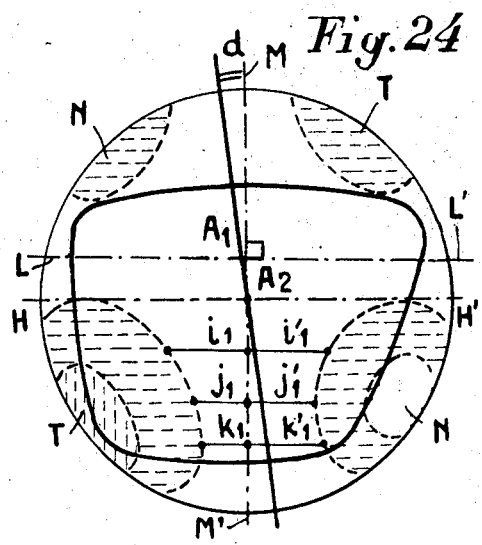
FIG. 24 evidences the objectionable asymmetry in the distribution of the aberration zones, the lens being mounted with the meridian disposed vertically.
Figure 25:
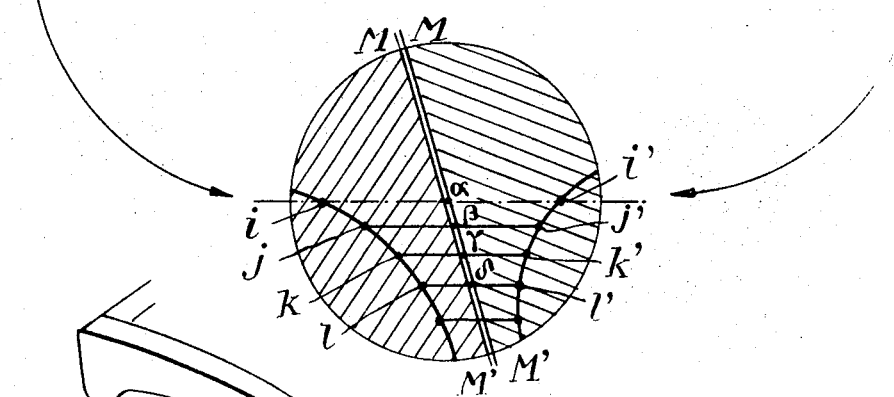
FIG. 25 illustrates the use of the lenses of this invention by a convergent sight in lateral vision.

Another solution for avoiding these aberrations F1 consists in mounting the lens by keeping its meridian MM' vertical as shown in FIG. 24. However, it is well known that when the user observes an object moving towards him the trace of the sighting axis of each eye on the lens associated therewith approaches the nose region. If it is desired to give the wearer the maximum field available it is necessary that, in the case of, say, a horizontal movement $i$ on the left-hand eye, to which corresponds a horizontal movement $i^1$ of the right-hand eye (FIG. 25), with of course $i = i^1$, the light beams of the two eyes meet on the lenses zones having the same optical characteristics, i.e. that the lens has an oblique symmetry in the horizontal direction, a feature not observed in the case shown in FIG. 24 ($i_1 \neq j^1{}_1, j_1 \neq j^1{}_1$ and $k_1 \neq k^1{}_1$). This solution is therefore to be avoided. One is thus lead, without departing from the scope of this invention, to use asymmetric surfaces by juxtaposing, during the manufacturing process carried out on a surface-cutting machine, two half-tables bearing the discrepancies corresponding to two different half-surfaces (FIG. 26), each half-surface having the same law of progression, i.e. having a same meridian MM', the chief advantage of this arrangement residing in the fact that it provides, on the lenses fitted in a spectacle mounting, an oblique meridian facilitating the normal convergence of the user's sight when changing from distant vision to close vision (FIG. 25), while preserving an oblique symmetry in the horizontal direction of the distribution of the aberrations.

Figure 26:
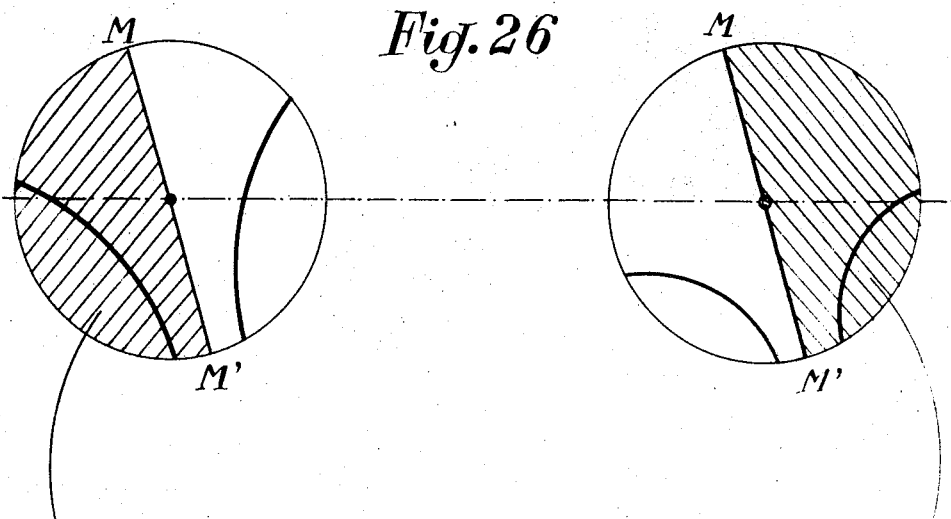
FIG. 26 illustrates the obtaining of a surface according to this invention by juxtaposing two different half-surfaces along their identical meridians of progression, and, FIG. 27 illustrates a modified form of embodiment of the invention.

In this case and by virtue of the juxtaposition of two different half-surfaces, it is possible to obtain aberration distribution patterns having an oblique symmetry in relation to the meridian MM', $i \alpha = \alpha i^1, j \beta = \beta j^1, k \gamma = \gamma k^1, 1 \delta = \delta 1^1$, etc.., (FIG. 26).

The above description gives by way of example a lens of which the surface displays an ample evolution of the sections orthogonal to MM, from the flattened ellipse to the acute hyperbola.

According to the power gradient to be obtained and the desired distribution of the zones of aberrations, it is possible to keep as the useful surface only one fraction of the surface described hereinabove, for example in the range from the flattened ellipse to the elongated ellipse, or from the elongated ellipse to the hyperbola.

Alternatively, it is also possible to use said surface for only one fraction of the refracting surface of the lens and to juxtapose thereto, with or without a visible joint, surface of different nature; thus, for example, an evolutive zone according to this invention may be juxtaposed to one or a plurality of spherical, toric or aspheric zones, or zones having a different refraction index. FIG. 27 shows by way of example an evolutive zone $Z_1$ and a zone $Z_2$, for example a spherical one, juxtaposed along the horizontal meridian $HH^1$ of the lens seen in its position of use, this meridian $HH^1$ being advantageously an umbilical line.

To simplify the disclosure, it has implicitly been assumed in the above-described example that the meridian was a plane curve. Of course, it would not constitute a departure from the present invention to adopt a skew curve, the sections to be considered for the purpose of this invention being in this case those taken along the main planes orthogonal to the osculating plane of the meridian MM' at the point involved.

Similarly, the present invention also includes surfaces of which the sections are complex high-degree curves, wherein the radius of curvature would be reserved in a direction laterally away from the meridian MM'.

What I claim is:

1. Ophthalmic lens having a progressively variable focal power, and comprising a refracting surface with a generally vertical meridian curve having a radius of curvature the value of which progressively varies according to a predetermined law to provide a desired power addition along said meridian curve, said refracting surface having at each point of said meridian curve two main radii of curvature having identical values, wherein said refracting surface further comprises a curve intersecting said meridian curve at right angles and lying in a plane also at right angles to said meridian curve, said intersecting curve being of substantially circular shape with a radius having a value equal to that of the radius of curvature of the meridian curve at the point of intersection of said meridian curve with said curve of substantially circular shape, and dividing said refracting surface into a first surface portion in which the value of the radius of curvature of the meridian curve decreases in the direction away from said point of intersection and a second surface portion in which the value of the radius of curvature of the meridian curve increases in the direction away from said intersection point, and wherein the sections of said first surface portion through planes at right angles to the meridian curve are aspheric curves intersecting said meridian curve at respective points of intersection, each of said section curves having a radius of curvature the value of which at the respective point of intersection with the meridian curve is equal to that of the radius of curvature of the meridian curve at said respective point of intersection and which increases from said value of the radius of curvature at the respective point of intersection in the direction away from said respective point of intersection, whereas the sections of said second surface portion through planes at right angles to the meridian curve are other aspheric curves intersecting said meridian curve at other respective points of intersection, each of said other section curves having a radius of curvature the value of which at the respective point of intersection with the meridian curve is equal to that of the radius of curvature of the meridian curve at said respective point of intersection and which decreases from said value of the radius of curvature at the respective point of intersection in the direction away from said respective point of intersection.

2. Ophthalmic lens according to claim 1, wherein the value of the radius of curvature of the meridian curve progressively varies from a first value at a first point of said meridian curve located in said first surface portion to a second value at a second point of said meridian curve located in said second surface portion, and wherein the respective values of the radii of curvature of said sections of the first surface portion tend, while increasing, towards said second value, whereas the respective values of the radii of curvature of said sections of the second surface portion tend while decreasing, towards said first value.

3. Ophthalmic lens according to claim 2, wherein at least one of the two section curves which are perpendicular to the meridian curve at said first and second points, respectively, is a curve along which the plane tangent to the refracting surface at any point of said curve makes a constant angle with the plane which is perpendicular to the meridian curve and which includes the optical center of the lens.

4. Ophthalmic lens according to claim 2, wherein at least one of the two section curves which are perpendicular to the meridian curve at said first and second points, respectively, is an umbilical curve, that is a curve each point of which is a point of the refracting surface where the two main radii of the refracting surfaces have, identical values.

5. Ophthalmic lens according to claim 4, wherein said refracting surface is symmetrical in relation to at least one of said umbilical curves.

6. Ophthalmic lens according to claim 4, wherein said refracting surface is symmetrical about at least one of said first and second points of the meridian curve.

7. Ophthalmic lens according to claim 1, wherein said refracting surface further comprise, in the marginal portion of the lens, at least one line which is substantially parallel to the meridian curve and along which the plane tangent to the refracting surface at any point of said line makes a constant angle with the osculating plane of said meridian curve at the optical center of the lens.

8. Ophthalmic lens according to claim 1, wherein said meridian curve lies in a plane.

9. Ophthalmic lens according to claim 8, wherein the plane of said meridian curve is inclined downwards from the temporal side to the nasal side of the lens when said lens is in its operative position in a spectacle mounting, and wherein any two points of the refracting surface which are equally spaced in the horizontal direction from said meridian curve have substantially the same optical characteristics.

* * * * *